(12) United States Patent
Spencer (10) Patent No.: US 7,843,951 B2
(45) Date of Patent: Nov. 30, 2010

(54) PACKET STORAGE SYSTEM FOR TRAFFIC HANDLING

(75) Inventor: Anthony Spencer, Wickwar (GB)

(73) Assignee: Rambus Inc., Los Altos, CA (US)

(*) Notice: Subject to any disclaimer, the term of this patent is extended or adjusted under 35 U.S.C. 154(b) by 1135 days.

(21) Appl. No.: 10/534,343

(22) PCT Filed: Nov. 11, 2003

(86) PCT No.: PCT/GB03/04866

§ 371 (c)(1),
(2), (4) Date: Jul. 18, 2005

(87) PCT Pub. No.: WO2004/045161

PCT Pub. Date: May 27, 2004

(65) Prior Publication Data

US 2005/0265368 A1 Dec. 1, 2005

(30) Foreign Application Priority Data

Nov. 11, 2002 (GB) .................................. 0226249.1

(51) Int. Cl.
H04L 12/28 (2006.01)

(52) U.S. Cl. ...................... 370/412; 370/389; 370/428; 370/474; 711/202; 365/230.03

(58) Field of Classification Search ............ 365/230.03, 365/207; 711/141, 143, 118, 202; 714/718, 714/805; 370/202, 229, 230, 231, 238, 235, 370/351, 352, 392, 389, 395.1, 395.3, 412, 370/413, 428, 432, 468, 470, 471, 473, 474, 370/437; 709/217, 236, 245

See application file for complete search history.

(56) References Cited

U.S. PATENT DOCUMENTS 5,187,780 A * 2/1993 Clark et al. ................. 710/106

(Continued)

OTHER PUBLICATIONS

International Preliminary Examination Report of PCT/GB2003/04866 dated Aug. 2, 2004.

(Continued)

*Primary Examiner*—Aung S Moe
*Assistant Examiner*—Abdullah Riyami
(74) *Attorney, Agent, or Firm*—Michael A. Glenn; Glenn Patent Group (57) ABSTRACT

Variable size incoming data packets are queued by generating from each data packet a record portion of predetermined fixed size and containing information about the packet. Data portions of the packets are stored in independent memory locations in a first memory while the record portions are stored in one or more managed queues in a second memory 3 having fixed size memory locations matching the size of the record portions. The first memory 4 is larger than the second memory. The memory locations in the first memory are arranged in blocks having two or more different sizes. Data portions that are too large to be stored in a single memory block are stored as linked lists in a plurality of blocks with pointers pointing to the next block. The memory locations are preferably matched to the most commonly occurring sizes of data packets so that nearly all packets are stored in one respective location. The memory locations in the first memory are preferably allocated from a local pool 6 of available addresses in batches from a central pool 7.

14 Claims, 4 Drawing Sheets

U.S. PATENT DOCUMENTS

| | | | |
|---|---|---|---|
| 5,513,134 A | 4/1996 | Cooperman et al. | |
| 5,768,275 A | 6/1998 | Lincoln et al. | |
| 6,160,814 A * | 12/2000 | Ren et al. | 370/427 |
| 6,314,489 B1 * | 11/2001 | Nichols et al. | 711/1 |
| 6,356,546 B1 * | 3/2002 | Beshai | 370/358 |
| 6,662,263 B1 * | 12/2003 | Wong | 711/103 |
| 7,035,212 B1 * | 4/2006 | Mittal et al. | 370/230 |
| 7,126,959 B2 * | 10/2006 | Van Asten et al. | 370/429 |
| 7,382,787 B1 * | 6/2008 | Barnes et al. | 370/401 |
| 2001/0021174 A1 * | 9/2001 | Luijten et al. | 370/229 |
| 2002/0031086 A1 * | 3/2002 | Welin | 370/229 |
| 2002/0064156 A1 * | 5/2002 | Minkenberg | 370/392 |
| 2002/0118689 A1 * | 8/2002 | Luijten et al. | 370/411 |
| 2003/0174699 A1 * | 9/2003 | Van Asten et al. | 370/389 |
| 2003/0179644 A1 * | 9/2003 | Anvar et al. | 365/233 |
| 2003/0188056 A1 * | 10/2003 | Chemudupati | 710/51 |
| 2004/0022094 A1 * | 2/2004 | Radhakrishnan et al. | 365/200 |
| 2004/0044815 A1 * | 3/2004 | Tan et al. | 710/300 |
| 2004/0117715 A1 * | 6/2004 | Ha et al. | 714/776 |
| 2004/0213291 A1 * | 10/2004 | Beshai et al. | 370/473 |
| 2005/0167648 A1 * | 8/2005 | Chang-Hasnain et al. | 257/14 |
| 2005/0265368 A1 * | 12/2005 | Spencer | 370/412 |
| 2007/0171900 A1 * | 7/2007 | Beshai et al. | 370/380 |

OTHER PUBLICATIONS

International Search Report of PCT/GB2003/04866 dated Apr. 1, 2004.

Office Action dated Jul. 4, 2008 for Chinese Patent Application No. 200380108479.0.

* cited by examiner

PACKET STORAGE SYSTEM FOR TRAFFIC HANDLING

FIELD OF THE INVENTION

In an egress traffic handler, packets may arrive in bursts at a rate which exceeds the output line rate. For example, the input rate may be at 80 Gbits/s whereas the line rate may be "only" 40 Gbits/s. Temporary packet buffering is therefore required. By buffering packets in logical queues, different grades of service can be acheived by varying the allocation of the available resources (line bandwidth and memory capacity) amongst the queues.

BACKGROUND TO THE INVENTION

The following issues in combination make packet buffering particularly difficult at 40 Gbits/s line rates:

1. High data bandwidth is required to accommodate the simultaneous reading and writing of packets (at worst case fabric overspeed).
2. High address bandwidth is required to cope with the worst case whereby streams of minimum sized packets are simultaneously being written to and read from the memory in a random access mode.
3. Memory capacity must be high as buffers will fill up rapidly during transient bursts at high line rates.
4. The manipulation of state which is associated with either logical queue management or memory management must be minimised at high line rates. The number of system clock cycles typically available to the hardware or software device which performs such a function will be minimal.

A solution which places packets directly into queues mapped into statically assigned memory can meet (2) and (4) but uses memory inefficiently and therefore fails on (3). A solution which buffers packets in on-chip memory or SRAM will be able to meet (2) but not (3) since SRAM is a low capacity memory. Implementing a solution which uses high capacity DRAM will be able to meet (3) but will have difficulty in meeting (2) as the random access time is small. In attempting to meet (1), solutions need to implement high bandwidth interconnects and high pincount interfaces.

Overall, it is very difficult to design architectures that meet all four criteria.

SUMMARY OF THE INVENTION

The invention provides, in one aspect, a method of queuing variable size data packets in a communication system, the method comprising: generating from a said data packet a record portion of predetermined fixed size and containing information about the packet, the data in the packet being in a data portion; storing data portions in independent memory locations in a first memory with each data portion having no connection with any other; storing record portions in one or more managed queues in a second memory having fixed size memory locations equal in size to the size of the record portions; wherein: the first memory is larger and has a lower address bandwidth than the second memory; and the memory locations in the first memory are arranged in blocks having a plurality of different sizes and the memory locations are allocated to the data portions according to the size of the data portions.

Conveniently, there may be two sizes of memory location in the first memory arranged in two said blocks, one of a size to receive relatively small data portions and the other of a size to receive relatively large data portions, and wherein data portions that are too large to be stored in a single memory block are stored as linked lists in a plurality of blocks with pointers pointing to the next block but without any pointers pointing from one data portion to the next data portion of the packet.

The memory locations in the blocks are preferably matched to the most commonly occurring sizes of data packets in the communication system. The memory locations in the first memory are preferably allocated from a pool of available addresses provided to it in batches from a central pool of available addresses.

The memory blocks may be segregated into a plurality of memory channels, and the addresses allocated to data portions sequentially across channels, whereby to spread the storage of data portions across the channels.

The data portions are preferably read from the first memory in pipelined manner by a data retrieval unit adapted to instruct a memory block to read out a data portion without having to wait for the previous read to be completed, and releasing the address location from the first memory.

Under circumstances where there is insufficient memory for a received packet, the record portion can be enqueued as though the corresponding data portion was stored in the first memory and the record portion corresponding to the said data packet subsequently read out, a flag set to indicate that the data portion of the said packet is to be discarded, the said data portion discarded, and the memory location notionally allocated to the discarded data portion released.

The address locations may be read from a bitmap of addresses and, when a memory location is released after the data stored therein has been read out, the address of the released memory location is sent directly to the pool. In another aspect, the invention provides a memory hub containing all the features necessary to carry out the method and as defined in the subsequent claims.

In its broadest sense, the invention, provides a Memory Hub which is used for buffering packets in a high line rate Traffic Handler so as to implement a large number of independently addressable memory channels using high speed serial links to memory hubs, to be applied to Traffic Handling on network linecards. Traffic Handling is characterised by high line rates and high speed random access into a large memory.

More broadly, the approach can be applied wherever (latency tolerant) high speed random access is required into a very large memory.

The invention according to the prefered implementation achieves the following:

Queue management and memory management are fully decoupled—(manifested by the packet/packet record concept. This addresses criterion (4))

There is direct streaming of packets into dynamically allocated memory with almost no first hand state manipulation—(supported by a memory manager and the use of a local pool. This addresses criterion 4)

Memory address space fragmentation and the availability tracking using the memory manager's bitmap provide necessary support for dynamic memory management— (helps to meet (3) through efficient memory usage)

Usage of high speed serial chip-to-chip links to Memory Hub(s)—(Remote fanout to multiple memory channels enables address and data bandwidth to be scaled to meet requirement without meeting implementation limits— addresses (1) and (2)).

BRIEF DESCRIPTION OF THE DRAWINGS

The invention will now be described with reference to the drawings, in which.

This invention embodies component behaviours, ideas and devices that are assembled into a solution which meets all the required criteria for 40 Gbits/s packet buffering in a traffic handling system. The Memory Hub is the primary embodiment of the invention. The invention will be described in terms of this primary embodiment, together with the peripherals necessary and/or desirable to achieve the levels of performance that the invention is capable of delivering. To that end, the following description is divided into sub-headings that address different aspects and/or features of the invention. It is inevitable that there will be some overlap between the following sections.

Figure 1:
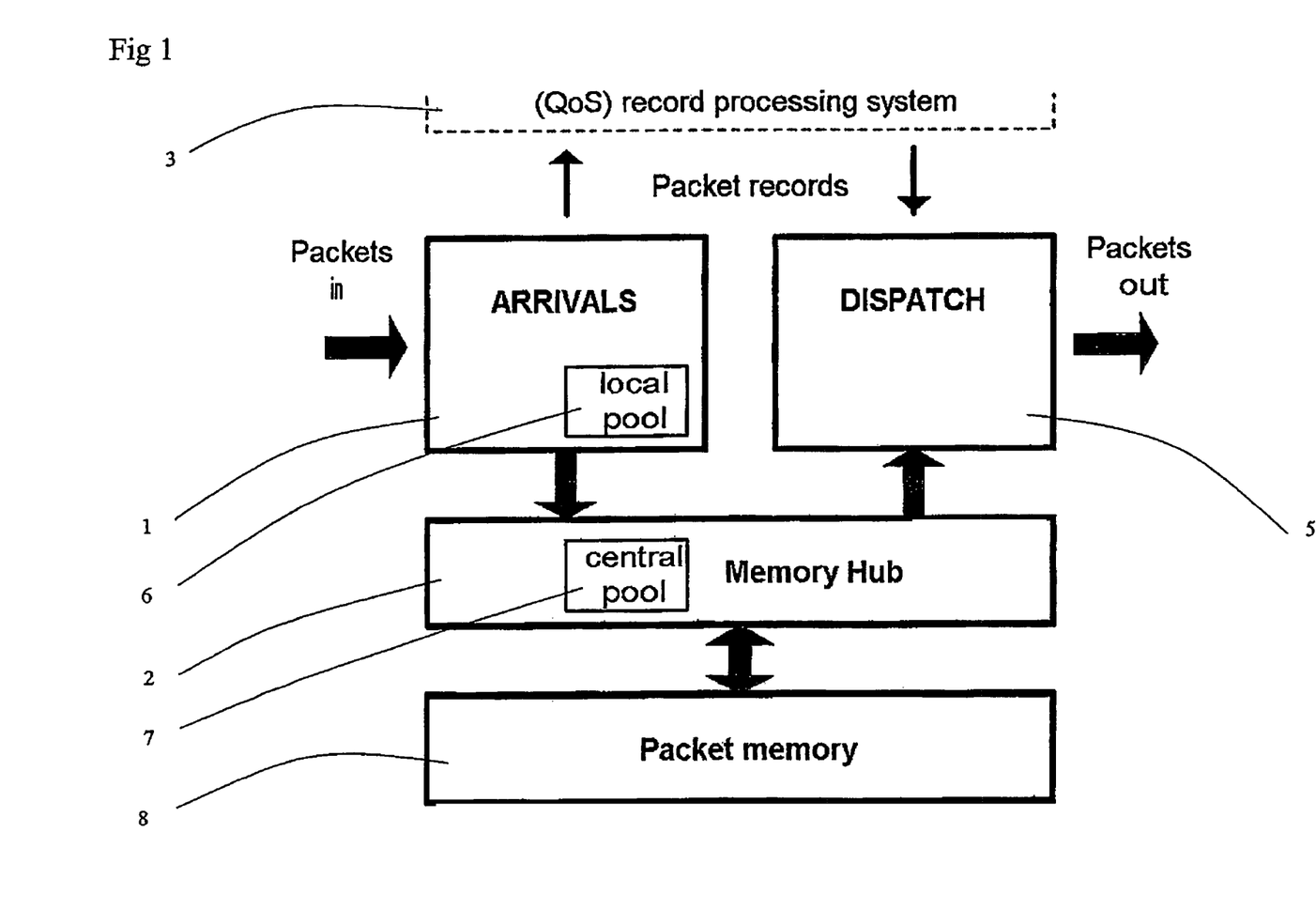
FIG. 1 is functional overview of the main components of the packet storage system.

Memory system decoupling—The primary purpose of this feature is to isolate the packet storage problem so that it is not entangled and interdependent with other functions. Relatively complex functions may be used to control the enqueueing and dequeueing of packets. The complexity of such packet handling/processing can be alleviated somewhat if the packets themselves are not passed around the system. Since access to packet content is not required in traffic handling, the packets can be placed in memory and be represented by small, fixed size packet records. It is these records which are processed and manipulated in logical queues or data structures. The packet records, scheduled in order, can subsequently be used to recover packets for forwarding on the output line. The processing and logical queue management functions are thus decoupled from the task of packet buffering and memory management. Subsequent QoS processing is performed on a small, fixed sized record of packet metadata. This record typically comprises the packet location in memory (address of first block), the identity of the stream to which the packet belongs (appended to the packet upstream), the packet length and control flags. Additional data is looked up locally using the stream identifier. Referring therefore to FIG. 1, streams of packets arriving at arrivals block 1 are of variable length. A packet record is generated from each received packet. Each packet record contains information about its respective data packet and thereby "represents" the data packet. Moreover, the packet rescords are of fixed size, leaving the data within the original packet to occupy a variable size data portion.

This is a crucial feature of the invention since it allows the record and data portions to be handled separately and independently of one another, thereby allowing storage for the record and the data to be optimised. The variable length data portions of the packets are sent to the memory hub 2 and the record portion to a record processing system 3. The packet records are shorter than the data portion, and can therefore be handled efficiently in the separate processing system 3 as compared to processing the whole of the received data packets as a single entity.

The memory hub 2 directs the data into the memory 4 proper in accordance with an address picked up by the packet from a local pool 6 on its way to the memory 4. As will be explained later, the local pool keeps a batch of available addresses sent to it from the memory hub 2. The system operates without any requirement for the pool to "request" an address for a particular data packet. The central pool 7 keeps the addresses of all the memory locations in the packet memory 4. In this way, data packets are simply streamed into the memory 4 with as little processing as possible in order to cope with a high data rate, eg currently up to 80 Gbits/s, from an incoming channel.

Packet records contain pointers to the packet data in memory. There are also flags, ie information that tells the system 3 how the record is to be treated, such as what queue it is to placed into and what priority it has. Every packet has a queue identifier.

Most packet storage/queuing systems process the whole packet, including record and data information, as a single entity and therefore fall foul of the criteria set out in the introduction. The present invention processes the packet records and data portions in a unique way that satisfies all of those criteria.

The use of a memory hub ensures that as little processing as possible is done on the packets as they arrive at high speed, whereas the packet records can be processed "off-line" at slower speeds. Data can thus be streamed directly into memory. Conventional methods employ techniques that involve identifying where in the queue the data is going to be written. Having written to it, the state has to be updated by rewriting the pointer. When new data arrives, the pointer is read and has to be updated again. This process is clearly intensive and slows down the overall process. In the preferred implementation of the invention, there is no "handshaking".

The immensely high speed of incoming data demands many channels of physical memory 4. This presents a "pin problem" in that the queues are so deep that the memories have to be large (eg 100s of megabytes) and cannot therefore be on-chip. The hub therefore provides a means for splitting off the physical and logical memory problems. It can then be a stand-alone chip. The memory hub provides a second device on which all the memory channels can be implemented without having to support different interfaces. The memory 4 is therefore preferably a set of memory chips and the memory hub potentially one chip.

The memory hub has knowledge of every block of memory that is free and passes a group of addesses from the central pool 7 to the local pool 6 in the arrivals block 1, indicating available locations for receiving data whose packet record has already been stripped off by the arrivals block. Every packet of data arriving at the arrivals block is issued with an address taken from the local pool 6 and is sent to the corresponding memory location for storage.

Memory management—Memory is generally statically or dynamically assigned when it is used as storage for data structures. An efficient scheme for assigning memory to packets involves the following features, which are provided in a preferred embodiment of the invention. Packet memory 4 is divided into small blocks in the memory address space. The blocks may be one of n different configured sizes. For reduced system complexity, n=2 is considered suitable. There is no static assignment of memory to queues. Instead, packets are stored into one or more blocks of a given size (as appropriate). Each block of a given packet points to the next in linked list fashion but there is no logical queue management in the memory 4. The availability of all memory blocks is recorded by a memory manager in the memory hub. The memory manager block is shown at 20 in the structural diagram of the memory hub shown in FIG. 2. The input side (the left hand side in FIG. 2) is kept simple so as to handle the high, 80

Figure 2:
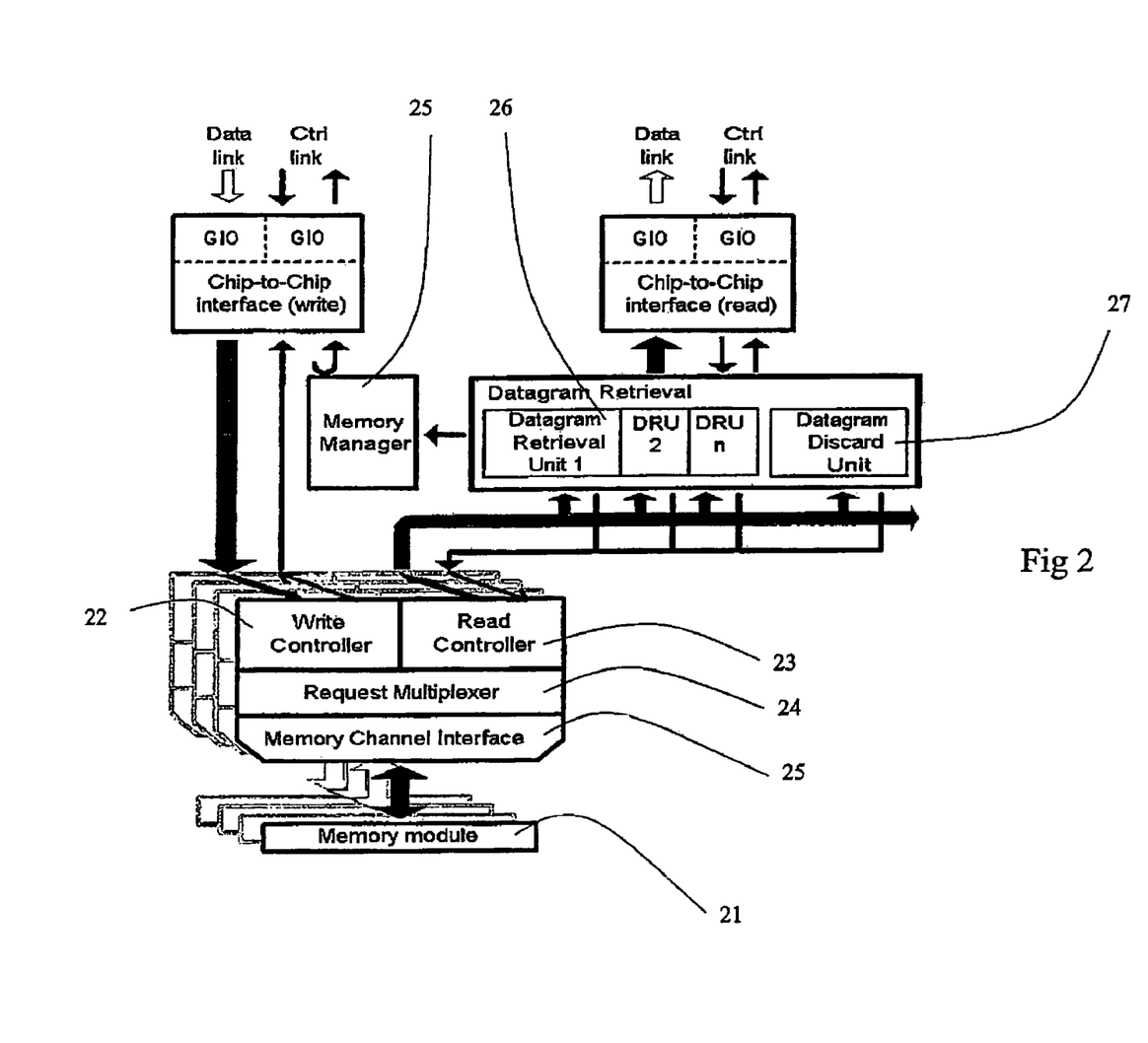
FIG. 2 is an architectural overview of the Memory Hub.

Gbits/s, data rate and the complexity is deliberately kept to the output side (right hand side in FIG. 2). The input side effectively comprises a continuous stream of data distributed to the different memory channels. Write operations effected by write controller 22 have priority over read operations efected by a read controller 23. Writes stream in and are distributed evenly over request multiplexer 24 and memory channel interface 25 across a plurality of memory channels according to the addresses allocated by the local pool 6 in arrivals block 1, as previously explained with reference to FIG. 1.

The memory manager 20 employs a bitmap of every available block of memory in the memory modules 21, each bit representing one block. When the memory manager sends a block of addresses from the central pool 7 to the local pool 6, the addresses relate to each of the modules. Therefore, when the incoming data picks up an address from the local pool 6, each packet or fragment of a packet will be sent to a different module, thereby achieving load-spreading. If each memory block in the modules has a capacity of 64 bytes, say, a whole packet can be stored in its entirety in one block, provided the packet size is less than 64 bytes. Larger packets, eg 256 bytes, will be stored across several blocks as a linked list. Since the data is stored in memory as linked lists, each block in the memory points to the next, so it is inefficient in retrieval if the first item of data has to be read and the pointer extracted before the next item is read. Therefore, it is beneficial for the memory to be divided into different sized blocks to accept large and small data packets respectively. In that way, large packets can be stored in large blocks so that the datagram retrieval units can read the first of the large blocks and, if the pointer is returned first, it can issue the request for the next before the first has finished being read, in pipelined fashion.

This assists in potential contention between the write and read controllers 22, 23 and also assists later in that, when the dispatch unit 5 sends a request to the memory hub for a particular packet, the request first comes to a datagram retrieval unit DRU, such as 26 in FIG. 2, which then issues the request to each channel in turn. There is, therefore, distribution on the read side as well as on the write side. This further enhances load spreading.

If it is considered that the input from the switch fabric is at 80 Gbits/s and the output side 40 Gbits/s, on average, situations can arise where data is being forwarded to the same output. Ideally there should therefore be buffers on the outputs to handle load bursts. Despite the size of the memories, they can still only handle fractions of a second of traffic in excess of 40 Gbits/s.

By reading words from this bitmap, the memory can identify the addresses of free blocks in batches. Bits are converted into addresses, and the addresses held in a central pool of limited but adequate size. This is a form of data decompression which is more storage efficient than maintaining a memory 'freelist'. (ie. storing all possible addresses in a queue or linked list). The central pool 7 can be topped up by either scanning the bitmap, or more directly from the stream of addresses which arrives as packets are read from memory and the memory blocks they occupy are released. If the central pool is full, returned addresses must be buffered and their information inserted into the bitmap.

Efficient packet storage—Placing information into memory will normally require the overhead of updating state which records the presence of the new information. A means of smoothly streaming data into memory at 80 Gbits/s is required which does not get held up by intermediate state manipulation. The Arrivals block 1 is a pipelined processor that extracts information from the packet which is used to create the packet record, and slices the packet up into chunks which can be mapped into memory blocks. An appropriate fragment size (and thus memory block size) is selected for each packet based on its length. The packet is forwarded to the Memory Hub and the packet record to the system for QoS processing and logical queueing. A separate local (and central) pool is required for each different memory block size implemented. This local pool enables Arrivals to load (fragmented) packets immediately into free blocks of memory. The only minor complexity in doing this is to insert the address of the last memory block of the same packet into the current block. It is a simple, fast system which requires no state manipulation other than to pop items from the local pool. An important feature of this system is that it supports load balancing across the available memory channels of the Memory Hub. When the local pool is replenished, it receives the addresses of memory blocks which are mapped into different physical memory channels in equal quantities. Consecutive blocks can thus be written to memory blocks in round robin fashion, efficiently spreading the address and data bandwidth load. In the unusual event that the local pool becomes empty, packets may need to be partially or fully dropped by Arrivals. Consider the situation where a record has been partially loaded into memory but the pool becomes temporarily empty, for example because of a glitch in the memory manager or is unable to return quickly enough to receive a new batch, the queues could fill up completely and therefore run out of memory. In that event, rather than correcting the problem, the remainder of the packet arriving at the arrivals block will be discarded and the packet record will still be sent through the processor 3 but that record will be tagged as being "garbage".

These events are therefore still reported through packet record creation so that event handling may be managed centrally by the QoS processor. The processor must purge the packet from memory and must report the details of any dropped packet. These are both functions the QoS processor already possesses for normal operation.

A significant feature of a preferred implementation of the invention is that the actual process of discarding the packet occurs at dispatch 5. Records come to the head of the queue in the dispatch block 5 as normal but are seen, because of the flag, as being garbage records. The data will still be read but then discarded so as to free up the memory allocated to that item of data without sending the garbage data to the line.

Figure 3:
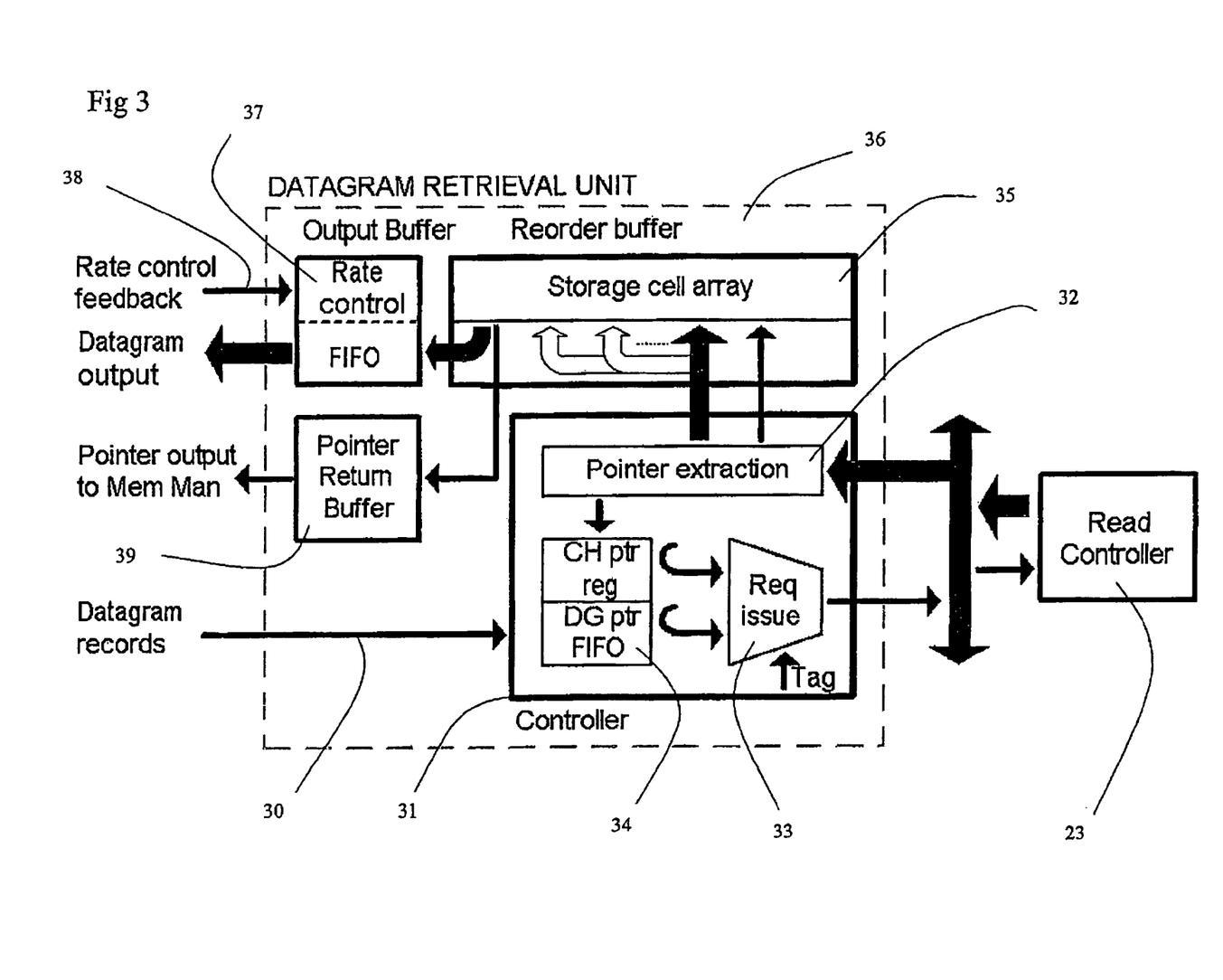
FIG. 3 is a Datagram Retrieval Unit design.

Efficient packet recovery—The packet storage function is deliberately simplified as its 80 Gbits/s performance requirement is challenging. Consequently, the 'open loop' method used by Arrivals makes the 40 G packet recovery function more complex. The main issue is that if a packet is stored in multiple blocks in memory, each pointing to the next, one block must be read and the 'next pointer' extracted before a request for the next block can be issued. The device that forwards packets to the line is the Dispatch block. It can be viewed as a type of DMA engine which gets addresses (packet records) from the QoS processing system, uses the address to fetch data (packet) from memory (the memory hub), and forwards the data to the line. Memory is nominally organised into n(=2) sets of blocks—large and small. Block sizes are selected to (a) optimise the usage of memory by matching peaks in the packet size distribution to the block sizes, and (b) to make retrieval of packets stored as linked lists more efficient. Thus, if all the incoming packets exhibit peaks at, say, 64 b/s and 256 b/s, the block sizes could be selected to match. The vast majority of packets then fit into single blocks and not many require to be spread between more than one block. It can be arranged for the arrivals block to make a value judgment as to which of the two sizes of block, whose addresses are held in two local pools rather than the single pool 6 shown in FIG. 1, to allocate to the packet in question. When a packet is stored in multiple memory blocks there is a delay between the request issued and the first data (which holds the address of the next block) returning. If the block is large enough then the next pointer can be extracted from the first few bytes of a block and the next request issued while the remainder of the block is still being read from memory. By selecting a memory block size such that the majority of packets can be stored in a single memory block, efficient aggregate packet recovery can be achieved. Packets can be fetched by a Datagram Retrieval Unit (DRU) 26, FIG. 2, in the Memory Hub in a fully pipelined mode (ie. a packet request may be sent before the response to a previous request has returned). If each packet is in a single block, the requests can be pipelined. All that is then required is for any necessary re-ordering to be carried out by the re-order buffer in FIG. 3, as will be explained in more detail later. However, if the packets are stored in linked lists, the data for each has to be retrieved before the next can be requested, thereby slowing down the retrieval process. FIG. 3 represents a Datagram Retrieval Unit (DRU). Records 30 arrive at the controller 31, which extracts the pointer from the record 32 and issues a request 33 but it knows whether that record was one of a string in a linked list. If it does not need to wait for the response to come back, it can issue the next. It can continue in this way. On the other hand, if it does need to wait, it stalls and a loop is established. The start of the packet comes back and the pointer is extracted. If the block is quite large, say a few hundred bytes long, the pointer is actually held so the first bytes of the block are already back before the last bytes have been read in the read controller. That pointer can therefore be extracted and looped back in the datagram pointer FIFO 34 in the controller and the next request issued for the next packet.

Once the packets in a linked list have been returned, they can be re-ordered in the storage cell array 35 of the re-order buffer 36. The storage cell array is equivalent to a series of pigeon holes into which the data is stored in the order in which it is to be read out. There is a pointer at the end of the sequence waiting for data to fill the next empty pigeon hole. As soon as that data is received, it can move along and, whenever it hits a gap, that gap means the data has not been returned.

Althought the buffer is sending data at a fixed rate, it is subject to rate control 37 under the command of rate control feedback input 38. In the pointer return buffer 39, the addresses of blocks that have been read are extracted so that that block can be freed up and the pointer output fed to the memory manager.

Thus, the recovery of multi-block packets can be made efficient by implementing a hierarchical packet retrieval system which has data recovery occuring at a number of different levels. Dispatch requests complete packets from the Datagram Retrieval Unit. The DRU fetches memory blocks from the memory read controllers of individual memory channels and reassembles packets. The memory read controllers fetch words from memory in burst read accesses, reassembling the block content by identifying the start and end of valid data within the block. For each memory block that the DRU reads, the block address is passed to the memory manager so that the relevant memory map bits can be updated (or the block address reused). Reverting now to FIG. 2, a Datagram Discard Unit 27 operates in a similar mode to the DRU but does not return data. Its purpose is to update the memory block state bits in the memory manager. Packets may be discarded because they have been truncated as a result of their having to be flagged as garbage because of the data input rate exceeding the storage capacity of the memory hub and memory modules, or because the traffic handler has implemented an algorithm to discard packets at random in order to manage queues. Although not relevant to the memory hub per se, it is the datagram discard unit that has responsibility for implementing the actual discard function. The packet will nevertheless be read from memory before discard, simply to extract the pointer. This can be done directly for packets stored in single blocks. Packets which are stored in multiple blocks must be read from memory so that the 'next block' pointers can be recovered.

Turning now to the memory manager, memory is generally assigned statically or dynamically when it is used for storage. In the invention, however, a "half-way house" is adopted between static and dynamic memory. If one part of memory were statically allocated to one queue and another part to another queue, this would be very inefficient, since there is a risk that all the traffic went into one queue. If it were dynamically allocated memory, the system would not able to receive data right up to the point where every single memory was full. Rather, the memory has been fragmented into smaller, bit-mapped blocks.

A bitmap is therefore maintained for those blocks. It is in the memory manager, stored preferably in SRAM, as a record of every single block in the memory. It includes information as to the status of the block, such as whether it is used or not. The local pool 6 can be refreshed by reading from the central pool 7. If the address word is 32 bits wide, it will return identities from zero up to 32 available blocks of memory. It provides, in an efficient manner, any available free memory. This can be instead of the approach of using a free list with a linked list of pointers pointing to every location. Although very thorough that approach is inefficient in that it reads the pointer to the first, which indicates that that particular block is free and then points to the next free block. By reading the bitmap, the pointers can be read at a much higher rate. In a single clock cycle, it is possible to read the identities of 32 free blocks at a time and convert them into complete addresses.

In the worst case, ie working along from one end of the memory to the other, reading the flags for 32 blocks at a time, it may be that, over two or three cycles, a densely occupied portion of memory is encountered and no flags are in evidence. In order to counteract the delay that may be caused by such an eventuality, the memory manager includes what may be termed a "cut-through" mode. When addresses are released by the DRUs and returned to the memory manager, they do not necessarily have to be returned into the bitmap. Instead, they can be buffered and recycled. When a request is received to fresh the local pool, the central pool does not have to get them out of bitmap. If its FIFO has buffered a batch of addresses returned for re-issue, it can release them instead.

The memory manager therefore includes SRAM for the bitmap. When an address, eg 12 bits wide, arrives from the DRU, it represents memory somewhere that has just been freed. It is labour intensive to have to convert that address into a bit, read the address word out of SRAM, insert the bit and then write it back. The read and write operations involve 32-bit words. A dedicated FIFO maintains the SRAM. It has already been explained that the local pool needs periodic refreshing. So, instead of reading the 32-bit words out of bitmap, converting them into pointers then sending those pointers back into the pool, it is preferable to recycle those sent back from the DRU.

Implementing a viable system—The partitioning of a system must be considerate of real world issues such as device pincounts, power dissipation, silicon process technology, PCB population and routing etc. Multiple, independently addressable memory channels are accessed via a Memory Hub. The Hub isolates the memory type and the fabrication technology required for that memory from the rest of the system. The Hub also enables a large, scalable number of memory channels to be implemented as (a) the hub package maximises the number of pins available for memory channel implementation, and (b) multiple hubs may be connected to a single QoS processing chip. Referring to FIG. 4, the Memory Hub 40 connects to the processing chips (QoS and Queue chips) via narrow high speed serial chip-to-chip links 41, 42. The burden of memory interfacing on the processing chip pincount is thus minimised, reducing the overall pincount and reducing the packaging cost of a potentially complex ASIC.

SUMMARY AND FURTHER DETAILS OF THE PREFERRED EMBODIMENT

As shown in FIG. 1, Arrivals and Dispatch provide the fork and join points in the packet stream. They isolate the memory hub which simly distributes packet chunks received from the high speed link to memory, or retrieves packets from memory on request.

As shown in FIG. 2 the bus acts as a crossbar between the DRUs and the memory channel controllers. This means that packets can be stored in memory blocks on multiple memory channels and fetched/reconstructed by a single DRU. Multiple DRUs exist to increase read bandwidth and provide load balancing for single line output (OC-768) systems. Alternatively, in multi-line systems (eg. 4×10 G Ethernet) a single DRU is assigned per line.

The memory manager contains the central pool and the memory bitmap. The memory bitmap would be implemented in embedded SRAM and would typically be 250 k bytes in size in order to support a 1 G packet memory organised as 512 byte memory blocks.

As shown in FIG. 3, the controller supervises read pipelining or the process of packet recovery from a linked list.

Figure 4A:
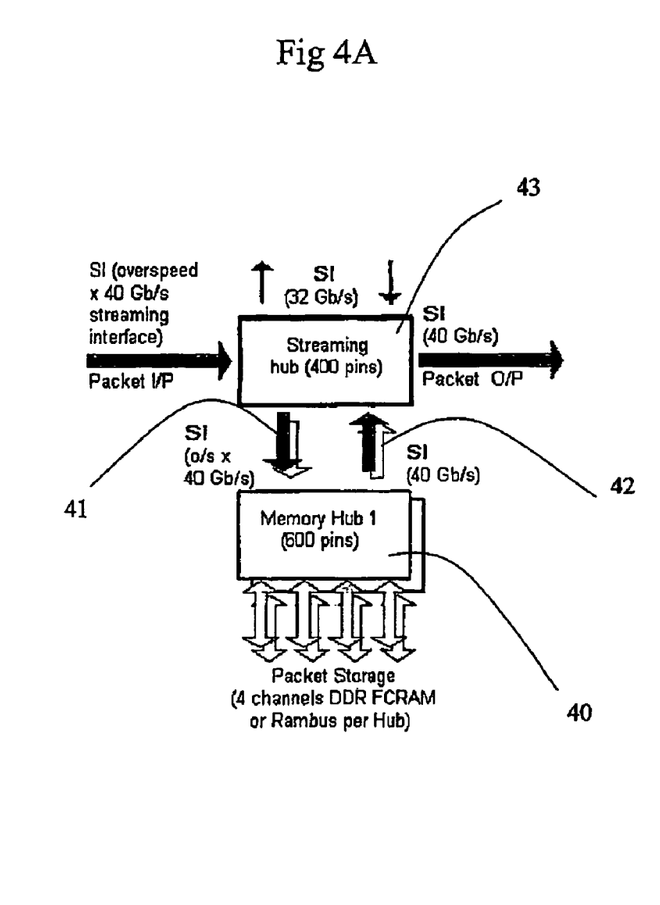
FIG. 4(a) is an implementation of a packet storage system for traffic handling for a Multi-chip, scalable implementation approach.
Figure 4B:
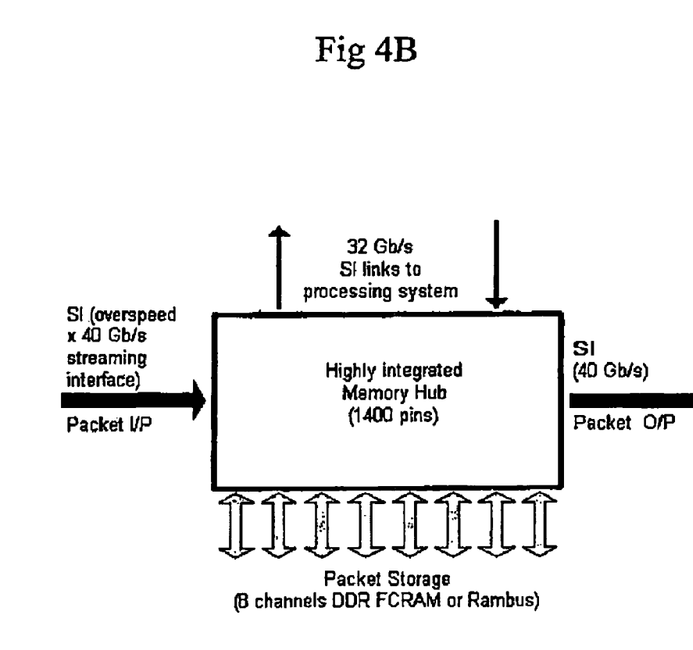
FIG. 4(b) is an implementation of a packet storage system for traffic handling for a Single chip, highly integrated solution.

FIG. 4 shows two possible system implementations. Eight channels of memory provide approximately 20 GBytes/s data bandwidth and 300 M random accesses per second. This meets requirement for 40 G traffic handling (2× switch fabric overspeed). While it is conceivable that the whole system could be implemented in a single device, as shown in FIG. 4(b), it may be more practical to distribute the function over multiple devices, as shown in FIG. 4(a). The use of memory hubs makes it possible to avoid having all the memories on one hub. For example, two instances of a single chip permits each chip to "own" half of the channels. The arrivals block can then distribute packets between the hubs and the dispatch block can recover data from the hubs. It may be necessary to balance traffic between the hubs.

There are many good reasons for using multiple devices, including:
 The physical distribution and second-level interconnect of a large number of memory devices on a PCB is alleviated if all devices are not clustered around a single highly integrated processor;
 The memory technology is divorced from the main, proprietary processing logic. This permits chip updating whilst still maintaining the same memory system and the memory system can be scaled without adding excessively to the number of pins. There is now physical and logical separation of the data storage from the processing system;
 It may be difficult to observe tight specifications on electrical characteristics, signal line separation and line termination if memory channels are clustered densely around the perimeter of a single chip;
 Power dissipation is more evenly spread. The combination of high power and pincount in a single device can require expensive packaging technology; The multi chip approach is also versatile in that the number of hubs used can be scaled to meet the memory requirement of the application (eg. scaling from 10 G to 40 G, and beyond).

The memory hub could be designed as a block of logic inside a chip, as shown in FIG. 4B. However, one of the advantages of the memory hub is that there is no intimate association between the queues stored in memory and the processing logic operating on those queues. The architecture in FIG. 4A has the advantage of separating the data storage function memory from the processing side, so it is a lot easier to effect interfaces. In FIG. 4A, data streams in and out of the streaming hub 43. Between this hub and the memory hub(s) are a request for pointers and a stream of pointers going back 41 and a stream of pointers being sent in and data coming back 42. No complex handshaking is required.

The invention claimed is:

1. A method of queuing variable size data packets in a communication system, the method comprising:
 generating from each said data packet a record portion of predetermined fixed size and containing information about the packet;
 storing only data portions of said packets in independent memory locations in a first memory;
 storing only said record portions in one or more managed queues in a second memory having fixed size memory locations equal in size to the size of the record portions;
 wherein:
 the first memory is larger than the second memory; and
 the memory locations in the first memory are arranged in blocks having a plurality of different sizes and the memory locations are allocated to the data portions according to the size of the data portions;
 wherein there are two sizes of memory location in the first memory arranged in two said blocks, one of a size to receive data portions of a first size and the other of a size to receive data portions of a second size, the second size being larger than the first size, and wherein data portions that are too large to be stored in a single memory block are stored as linked lists in a plurality of blocks with pointers pointing to the next block.

2. A method as claimed in claim 1, wherein the sizes of the memory locations in the blocks are matched to the most commonly occurring sizes of data packets in the communication system.

3. A method as claimed in claim 1, further comprising allocating the memory locations in said first memory from a pool of available addresses provided to it in batches from a central pool of available addresses.

4. A method as claimed in claim 3, wherein the memory blocks are segregated into a plurality of memory channels, the method further comprising allocating addresses to data portions sequentially across channels whereby to spread the storage of data portions across the channels.

5. A method as claimed in claim 3, further comprising reading the data portions from the first memory in pipelined manner by a data retrieval unit adapted to instruct a memory block to read out a data portion without having to wait for the previous read to be completed, and releasing the address location from the first memory.

6. A method as claimed in claim 1, further comprising, under circumstances where there is insufficient memory for a received packet, enqueueing the record portion as though the corresponding data portion was stored in the first memory, subsequently reading out the record portion corresponding to the said data packet, setting a flag to indicate that the data portion of the said packet is to be discarded, discarding the said data portion, and releasing the memory location notionally allocated to the discarded data portion.

7. A method as claimed in claim 5, further comprising reading the address locations from a bitmap of addresses and, when a memory location is released after the data stored therein has been read out, the address of the released memory location is sent directly to the pool.

8. A memory hub for queuing received data packets, comprising:
- an arrivals block, adapted to generate from each said data packet a record portion of predetermined fixed size and containing information about the packet;
- a first memory for storing only data portions of said packets in independent memory locations;
- a second memory for storing only said record portions in one or more managed queues, the memory having fixed size memory locations equal in size to the size of the record portions;
- wherein:
- the first memory is larger than the second memory; and
- the memory locations in the first memory are arranged in blocks having a plurality of different sizes and the memory locations are allocated to the data portions according to the size of the data portions;
- wherein there are two sizes of memory location in the first memory arranged in two said blocks, one of a size to receive data portions of a first size and the other of a size to receive data portions of a second size, the second size being larger than the first size, and wherein data portions that are too large to be stored in a single memory block are stored as linked lists in a plurality of blocks with pointers pointing to the next block but without any pointers pointing from one data portion to the next data portion of the packet.

9. A memory hub as claimed in claim 8, wherein the sizes of the memory locations in the blocks are matched to the most commonly occurring sizes of data packets in the communication system.

10. A memory hub as claimed in claim 8, wherein the memory locations in said first memory are allocated from a pool of available addresses provided to it in batches from a central pool of available addresses.

11. A memory hub as claimed in claim 10, wherein the memory blocks are segregated into a plurality of memory channels, and addresses are allocated to data portions sequentially across channels whereby to spread the storage of data portions across the channels.

12. A memory hub as claimed in claim 10, further comprising a data retrieval unit adapted to read out the data portions from the first memory in pipelined manner and to instruct a memory block to read out a data portion without having to wait for the previous read to be completed, and releasing the address location from the first memory.

13. A memory hub as claimed in claim 8, further comprising flag setting means such that, under circumstances where there is insufficient memory for a received packet, the record portion is enqueued as though the corresponding data portion was stored in the first memory, the record portion corresponding to the said data packet is subsequently read out, and the flag setting means sets a flag to cause the data portion of the said packet to be discarded and the memory location notionally allocated to the discarded data portion released.

14. A memory hub as claimed in claim 12, further comprising a bitmap of address locations and means operable such that, when a memory location is released after the data stored therein has been read out, the address of the released memory location is sent directly to the pool.

* * * * *